No. 697,755. Patented Apr. 15, 1902.
G. STERN.
ALTERNATING CURRENT METER.
(Application filed Aug. 23, 1900.)
(No Model.)

Witnesses:
Lewis P. Abell.
Benjamin B. Hull

Inventor:
George Stern,
by Albert G. Davis
Atty.

THE NORRIS PETERS CO., PHOTO-LITHO., WASHINGTON, D. C.

UNITED STATES PATENT OFFICE.

GEORGE STERN, OF CHARLOTTENBURG, GERMANY, ASSIGNOR TO GENERAL ELECTRIC COMPANY, A CORPORATION OF NEW YORK.

ALTERNATING-CURRENT METER.

SPECIFICATION forming part of Letters Patent No. 697,755, dated April 15, 1902.

Application filed August 23, 1900. Serial No. 28,662. (No model.)

*To all whom it may concern:*

Be it known that I, GEORGE STERN, a subject of the Emperor of Germany, residing at Charlottenburg, Germany, have invented certain new and useful Improvements in Alternating-Current Meters, (Case No. 6,393,) of which the following is a specification.

My invention relates to alternating-current meters, and has for its object to produce a new and improved meter for measuring the energy of a balanced three-phase system.

It is well known that when the different branches of a three-phase system are equally loaded the energy in the system may be measured by an ordinary wattmeter. In this case it is necessary that the potential winding of the instrument carry a current which is in phase with the current flowing in the series winding when the load is non-inductive. This principle has been practically applied in electrodynamically-operated meters by connecting the potential winding at one end to the main in which the series winding is included and at its other end to an artificial zero-point. When meters operating on the Ferraris principle are used, it has heretofore been customary to so connect the shunt and series windings of the meter that the current flowing in the shunt-winding will be displaced in phase by ninety degrees from the current in the series winding or non-inductive load. In such an arrangement the series coil of the instrument is included in circuit with one of the mains of the system and the shunt-coil is connected across the other two mains.

My invention involves a new arrangement of the actuating windings and employs series windings supplied with current from two of the three-phase mains and a shunt-winding supplied with current from a circuit connected across two of the mains. The circuit in which the shunt-winding is included is so organized that the magnetization due thereto will be displaced by ninety degrees from the resultant of the magnetizations to the series windings.

My invention will be better understood by reference to the following description, taken in connection with the accompanying drawings, while its scope will be pointed out in the appended claims.

Figure 1:
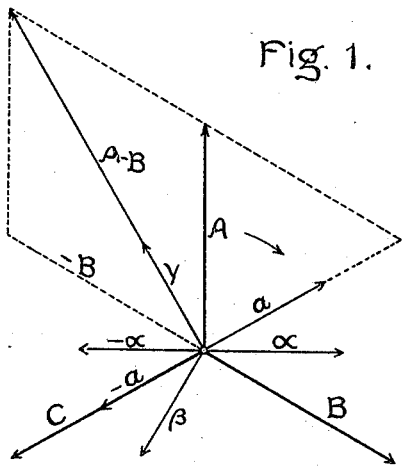
Figure 2:
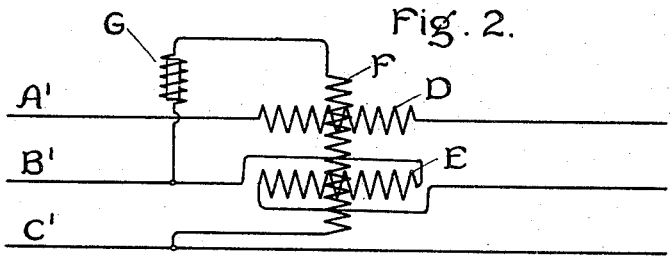

In the drawings, Figure 1 is a diagram showing the phase relations of the currents in the windings of a meter arranged according to my invention. Fig. 2 represents diagrammatically shunt and series coils connected to a three-phase system in accordance with my invention, and Fig. 3 indicates one way in which my invention may be applied to an actual meter construction.

In the diagram of Fig. 1, A B C represent the instantaneous values of the currents in the mains of a balanced three-phase system and $\alpha$ $\beta$ $\gamma$ the electromotive forces between said mains. It will be noted that $\alpha$ is displaced by ninety degrees from A, $\beta$ by ninety degrees from B, and $\gamma$ by ninety degrees from C. It is therefore possible, as already explained, to measure the energy in the system by means of an induction-meter having its series windings supplied with current of the phase A, B, or C and its shunt-windings supplied with current of the phase $\alpha$, $\beta$, or $\gamma$, respectively.

According to my invention it is also possible to measure the energy in such a system by means of windings so arranged that the phase relation between the currents in the shunt and series winding is equivalent to a ninety-degree relation on non-inductive load. If, therefore, two series windings are used, one supplied with current of the phase A and the other with the phase —B in connection with a shunt-winding supplied with current in the phase —$\alpha$, the effect will be the same as if the meter had a single series winding supplied with current in the phase A—B and a single shunt-winding supplied with current in the phase —$\alpha$, (that is, the same effect as if there were a single shunt-winding carrying a current displaced by ninety degrees on non-inductive load from the current in a single series winding.) It is on this principle that my meter is constructed.

In Fig. 2, A' B' C' represent the mains of a three-phase system, D represents a series winding included in circuit with the main A', and E a series winding included in circuit with the main B'. These windings constitute the series windings of an induction-meter and are arranged in coöperative relation to a shunt-winding F, which is connected between the main C' and one of the mains in which the series windings are included. As shown in the drawings, the shunt-winding is connected between the mains B' and C', and the shunt-circuit is so organized that the current flowing therein will be displaced by thirty degrees from its impressed electromotive force. As shown in the drawings, the requisite self-induction is obtained by including an inductive resistance in circuit with the shunt-winding; but the shunt-winding itself may be so constructed that it will contain the necessary self-induction, or any other suitable arrangement for producing the desired result may be employed.

In the particular arrangement shown in Fig. 2 the coil D, when the load on the system is non-inductive, is supplied with a current whose phase relation is indicated by the line A in Fig. 1, and the coil E is under similar conditions traversed by a current whose phase is represented by the line $-B$, Fig. 1. The potential between the mains B' and C' is represented by the $\alpha$ in Fig. 1, and, as above stated, the circuit is so organized that the current flowing therein will have a phase lagging by thirty degrees behind its impressed electromotive force, the connections being reversed, so that the shunt-current will have a phase relation represented by the line $-a$ in Fig. 1. Such an arrangement of the actuating-windings renders the meter less liable to error due to unbalancing of the system than an arrangement employing only a single series winding and also renders it easier to obtain the proper phase relation of the current flowing in the shunt-winding. The two series windings must both be arranged in coöperative relation to the shunt-winding; but it is not necessary that they should be so arranged that they will actually coöperate to produce a resultant magnetization. They may constitute separate coils or may be combined in a single coil.

Figure 3:
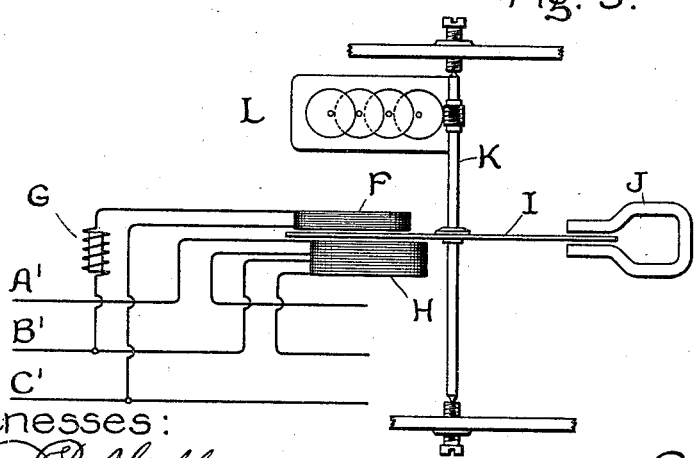

In Fig. 3 the invention is shown applied to a meter of ordinary disk type. In this figure F represents, as before, the shunt-winding connected between the mains B' and C' in a circuit including the self-induction coil G. The series windings are here shown as comprised in a single coil H. The shunt and series coils are arranged in coöperative relation to the disk I, rotating between the poles of the retarding-magnet J and connected through the shaft K with the recording device L.

What I claim as new, and desire to secure by Letters Patent of the United States, is—

1. In combination in an induction-meter for three-phase systems, series windings included in circuit with two of the mains, and a circuit containing a shunt-winding connected between the third main and one of the other mains, said circuit being so organized that the current therein is displaced by ninety degrees from the resultant of the currents flowing in the series windings on non-inductive load.

2. In combination in an induction-meter for three-phase systems, series windings included in circuit with two of the mains, and a circuit containing a shunt-winding connected between the third main and one of the other mains, said circuit being so organized that the current therein is displaced by thirty degrees from its impressed electromotive force.

3. In combination in an induction-meter for three-phase systems, series windings included in circuit with two of the mains, a shunt-winding connected between the third main and one of the other mains, and means in circuit with said shunt-winding for causing the current therein to be displaced by thirty degrees from its impressed electromotive force.

In witness whereof I have hereunto set my hand this 8th day of August, 1900.

GEORGE STERN.

Witnesses:
GEORG GAGA,
M. HAUNKE.